United States Patent
Nelson et al.

(10) Patent No.: US 12,021,879 B2
(45) Date of Patent: Jun. 25, 2024

(54) VERIFICATION OF MESSAGE PATTERNS FOR VEHICLE ECUs

(71) Applicant: Ford Global Technologies, LLC, Dearborn, MI (US)

(72) Inventors: Jacob David Nelson, Westland, MI (US); Venkata Kishore Kajuluri, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 17/666,981

(22) Filed: Feb. 8, 2022

(65) Prior Publication Data

US 2023/0254322 A1  Aug. 10, 2023

(51) Int. Cl.
*H04L 9/40* (2022.01)
*H04L 12/40* (2006.01)

(52) U.S. Cl.
CPC .............. *H04L 63/12* (2013.01); *H04L 12/40* (2013.01); *H04L 63/08* (2013.01); *H04L 63/1425* (2013.01); *H04L 2012/40215* (2013.01)

(58) Field of Classification Search
USPC .......................................................... 726/4
See application file for complete search history.

(56) References Cited

U.S. PATENT DOCUMENTS

| | | | |
|---|---|---|---|
| 7,761,530 B2 | 7/2010 | Cain et al. | |
| 8,667,591 B1* | 3/2014 | Claudatos | G06F 21/564 |
| | | | 726/24 |
| 2018/0293389 A1* | 10/2018 | Mahaffey | H04L 63/166 |
| 2020/0117388 A1* | 4/2020 | Horns | G06F 3/0604 |
| 2020/0134175 A1* | 4/2020 | Marwah | G06F 9/542 |
| 2021/0021610 A1* | 1/2021 | Ahire | H04L 67/12 |
| 2021/0203682 A1* | 7/2021 | Bajpai | G06F 21/55 |
| 2021/0274010 A1 | 9/2021 | Stein et al. | |
| 2022/0086022 A1* | 3/2022 | Ye | H04L 12/40163 |
| 2023/0275877 A1* | 8/2023 | Harel | G01C 21/3822 |
| | | | 713/189 |

FOREIGN PATENT DOCUMENTS

| | | | | |
|---|---|---|---|---|
| CN | 108600192 A | 9/2018 | | |
| CN | 111309684 A | 6/2020 | | |
| CN | 113746705 A | 12/2021 | | |
| WO | 2020178811 A1 | 9/2020 | | |
| WO | WO-2020178811 A1 * | 9/2020 | ........... | G06F 11/0739 |

* cited by examiner

*Primary Examiner* — Sakinah White Taylor
(74) *Attorney, Agent, or Firm* — Christopher Storms; Bejin Bieneman PLC (57) ABSTRACT

A computer includes a processor and a memory, and the memory stores instructions executable by the processor to receive a plurality of first message patterns; receive a plurality of second message patterns; determine a set of differences between the first message patterns and the second message patterns; for at least one of the differences, determine a respective resolution in favor of either the first message patterns or the second message patterns; and generate a plurality of third message patterns. The message patterns define messaging between electronic control units on board a vehicle. The message patterns include values for attributes assigned to the respective message patterns. The third message patterns include the at least one resolution and commonalities between the first message patterns and the second message patterns.

20 Claims, 3 Drawing Sheets

VERIFICATION OF MESSAGE PATTERNS FOR VEHICLE ECUs

BACKGROUND

Modern vehicles typically include several electronic control units (ECUs) that communicate with each other by sending messages through a Controller Area Network (CAN) bus. The messages can follow a format such as database CAN (DBC). DBC files typically include designated bits for identifying the message, interpreting the payload, and carrying the payload.

DETAILED DESCRIPTION

Modern vehicles typically include several electronic control units (ECUs) that control various functions of the vehicle. The ECUs can communicate with each other by sending messages through a Controller Area Network (CAN) bus. As will be described herein, the ECUs can store message patterns, which specify how information is arranged and formatted within the messages, e.g., presence or absence, ordering, and bit length for elements such as message identification, data length code, payload, freshness value, message authentication code, etc. Different ECUs can use different message patterns, and the ECUs can reject messages that don't conform to the expected message pattern. The different message patterns have different values for attributes of the message patterns, e.g., length of the payload, designated destination ECUs, authentication status, etc. In particular, one attribute of the message patterns is the authentication status, i.e., whether the message patterns are authenticated or unauthenticated. The message patterns can differ based on authentication status in terms of what information is included, e.g., authenticated message patterns can include designated bits for a message authentication code and/or freshness value, and unauthenticated message patterns can lack those designated bits.

The techniques described herein can provide improved reliability and more robust operation of the ECUs on board a vehicle. The techniques include a computer programmed to receive a plurality of first message patterns and a plurality of second message patterns; determine a set of differences between the first message patterns and the second message patterns; for at least some of the differences, determine respective resolutions, each resolution in favor of either the first message patterns or the second message patterns; and generate a plurality of third message patterns that include the resolutions as well as commonalities between the first and second message patterns. The third message patterns can be installed onto the ECUs on board a vehicle. The resolutions can be determined according to a set of rules installed on the computer. Using the third message patterns can reduce errors caused by messages not conforming the expected message patterns of their destination ECUs.

A computer includes a processor and a memory, and the memory stores instructions executable by the processor to receive a plurality of first message patterns; receive a plurality of second message patterns; determine a set of differences between the first message patterns and the second message patterns; for at least one of the differences, determine a respective resolution in favor of either the first message patterns or the second message patterns; and generate a plurality of third message patterns. The first message patterns define messaging between electronic control units on board a vehicle. The first message patterns include first values for attributes assigned to the respective first message patterns. The second message patterns define messaging between the electronic control units on board the vehicle. The second message patterns include second values for the attributes assigned to the respective second message patterns. The third message patterns include the at least one resolution and commonalities between the first message patterns and the second message patterns.

The instructions may further include instructions to generate authentication statuses of the first message patterns and of the second message patterns, each authentication status may be a classification of the respective message pattern as authenticated or unauthenticated, and the attributes may include the authentication status. Generating the authentication statuses may be based on whether the ECUs designated to transmit the respective message patterns support authentication.

The instructions may further include instructions to generate at least one of the first values and at least one of the second values based on the authentication statuses.

The set of differences may include absence of one of the first message patterns from the second message patterns.

The commonalities may include a common message pattern present in the first message patterns and present in the second message patterns, and the set of differences may include classification of the common message pattern as authenticated in the first values of the attributes and as unauthenticated in the second values of the attributes.

Determining the at least one resolution may include selecting either the first message patterns or the second message patterns according to a set of rules. The set of the rules may depend on absence of one of the first message patterns from the second message patterns.

The commonalities may include a common message pattern present in the first message patterns and present in the second message patterns, and the set of the rules may depend on classification of the common message pattern as authenticated in the first values of the attributes and as unauthenticated in the second values of the attributes.

The set of the rules may include at least one lookup table, and an output of the at least one lookup table may include the selection of the first message patterns or the second message patterns. Inputs of the at least one lookup table may include presence or absence of the respective first message patterns, presence or absence of the respective second message patterns, authentication or unauthentication of the respective first message patterns, and authentication or unauthentication of the respective second message patterns.

The at least one resolution may be at least one automatic resolution, and the instructions may further include instructions to, for at least one of the differences, receive a respective input from an operator indicating a selection of the first message patterns or the second message patterns for a respective manual resolution. The instructions may further include instructions to output to the operator a prompt to select the first message patterns or the second message patterns for the at least one manual resolution.

The instructions may further include instructions to, according to a set of rules, for at least one of the differences, determine whether (a) to receive an input from an operator indicating the selection of the first message patterns or the second message patterns for a respective resolution or (b) to select the first message patterns or the second message patterns without receiving the input for the respective resolution. Selecting the first message patterns or the second message patterns without receiving the input may be performed according to the set of the rules.

The set of the rules may include a lookup table, and an output of the lookup table may include the determination to receive the input indicating the selection or to select without receiving the input, based on the set of the differences.

The instructions may further include instructions to assess a format of the first message patterns, and in response to at least one of the first message patterns having an invalid format, output a list of the at least one of the first message patterns having an invalid format.

The instructions may further include instructions to output a first list including the third message patterns, and output a second list including any of the first message patterns or second message patterns not included in the third message patterns.

The instructions may further include instructions to transmit the third message patterns to the electronic control units on board the vehicle.

A method includes receiving a plurality of first message patterns; receiving a plurality of second message patterns; determining a set of differences between the first message patterns and the second message patterns; for at least one of the differences, determining a respective resolution in favor of either the first message patterns or the second message patterns; and generating a plurality of third message patterns. The first message patterns define messaging between electronic control units on board a vehicle. The first message patterns include first values for attributes assigned to the respective first message patterns. The second message patterns define messaging between the electronic control units on board the vehicle. The second message patterns include second values for the attributes assigned to the respective second message patterns. The third message patterns include the at least one resolution and commonalities between the first message patterns and the second message patterns.

With reference to the Figures, wherein like numerals indicate like parts throughout the several views, a computer 100 includes a processor and a memory, and the memory stores instructions executable by the processor to receive a plurality of first message patterns 102; receive a plurality of second message patterns 104; determine a set of differences 106 between the first message patterns 102 and the second message patterns 104; for at least one of the differences 106, determine a respective resolution in favor of either the first message patterns 102 or the second message patterns 104; and generate a plurality of third message patterns. The first message patterns 102 define messaging between electronic control units (ECUs) 108 on board a vehicle 110, and the first message patterns 102 include first values for attributes assigned to the respective first message patterns 102. The second message patterns 104 define messaging between the ECUs 108 on board the vehicle 110, and the second message patterns 104 include second values for the attributes assigned to the respective second message patterns 104. The third message patterns include the at least one resolution and commonalities 112 between the first message patterns 102 and the second message patterns 104.

Figure 1:
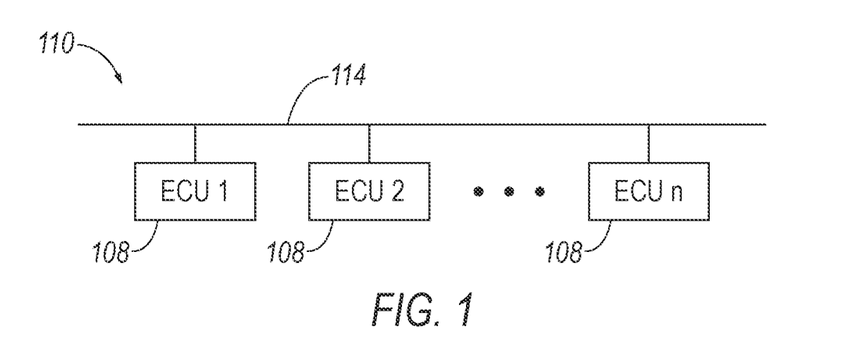
FIG. 1 is a block diagram of an example vehicle.

With reference to FIG. 1, the vehicle 110 may be any passenger or commercial automobile such as a car, a truck, a sport utility vehicle, a crossover, a van, a minivan, a taxi, a bus, etc.

The vehicle 110 can include a Controller Area Network (CAN) bus 114. The CAN bus 114 can communicatively couple the ECUs 108, and the ECUs 108 may transmit and receive data through the CAN bus 114. The CAN bus 114 can use multiplex electrical wiring to interconnect the ECUs 108. The CAN bus 114 can be divided into subnetworks connected together, e.g., by a gateway module.

The ECUs 108 are microprocessor-based computing devices, e.g., generic computing devices including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. Each ECU 108 can thus include a processor, a memory, etc. The memory of each ECU 108 can include media for storing instructions executable by the processor as well as for electronically storing data and/or databases, and/or the ECU 108 can include structures such as the foregoing by which programming is provided.

The ECUs 108 can be programmed for performing different functions for the vehicle 110. For example, the ECUs 108 can include an engine control module, a body control module, a restraint control module, an accessory control module, a power-steering control module, an antilock brake control module, etc. The vehicle 110 may contain between fifty and one hundred ECUs 108.

Figure 2:
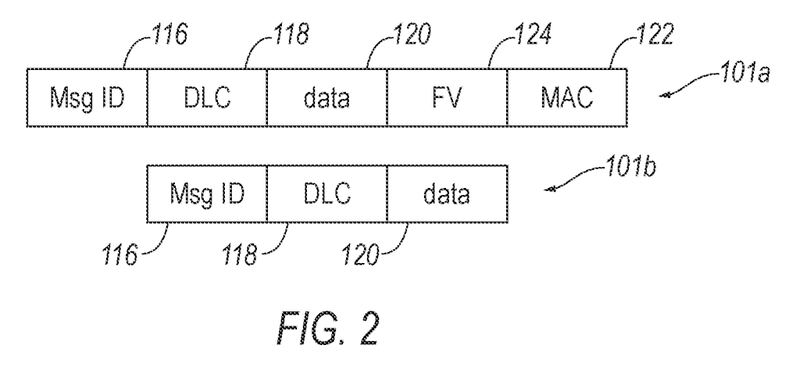
FIG. 2 is a diagram of example message patterns used by electronic control units on board the vehicle.

With reference to FIG. 2, message patterns 101 define messaging between the ECUs 108 on board the vehicle 110. For the purposes of this disclosure, a "message pattern" is defined as instructions specifying a format for a message between ECUs 108. For example, the message patterns 101 can specify an order of information included in a message, how many bits are allocated to each piece of information, what information a pattern of bits represents, which ECUs 108 transmit and/or receive a message, and so on. For example, the message patterns 101 can include a message identification 116, a data length code 118 after the message identification 116, and data content 120 after the data length code 118. The message identification 116 uniquely specifies the message and can represent a priority of the message. The data length code 118 can specify a bit length of the data content 120. The data content 120 contains the informational content of the message, i.e., the payload, e.g., engine RPMs from the engine control module, deployment instructions for airbags or pretensioners from the restraint control module, etc.

Messages can be classified according to data types of the messages. A data type of a message, which can also be referred to as a signal, can be specified by the data content 120 of that message, the ECUs 108 designated as recipients of that data content 120, and the ECUs 108 designated as transmitters of that data content 120. For example, one example data type can include that the data content 120 is engine RPMs, the engine control module is the transmitting ECU 108, and a list of multiple ECUs 108 are the receiving ECUs 108. Each message pattern 101 can specify the format that messages of one or more data types take; i.e., each data type is assigned to one message pattern 101, and each message pattern 101 has one or more data types assigned to it.

An ECU 108 that generates a data type can have the message pattern 101 corresponding to that data type installed. When the ECU 108 generates data of that data type, the ECU 108 can use the message pattern 101 to construct messages for transmitting that data to other ECUs 108 as the data content 120 of the messages.

ECUs 108 that use a data type can have the message pattern 101 corresponding to that data type installed. When an ECU 108 receives a message, the ECU 108 can use the message pattern 101 that the message is expected to follow to parse the message and thereby retrieve the data content 120 of the message. The ECU 108 can determine an expected message pattern 101 for a message, e.g., by using the message identification 116 included in the message. If the message does not follow the expected message pattern 101, the ECU 108 can reject the message and refrain from using the data content 120 in the message.

The message patterns 101 include values for attributes assigned to the respective message patterns. An attribute defines some aspect of a message pattern 101, i.e., defines metadata associated with the message pattern 101. In particular, the attributes can be related to authentication of the messages. The attributes at least partially define the message patterns 101. In other words, an attribute having a particular value defines some portion of the message pattern 101. For example, the attributes can include a classification as authenticated or unauthenticated, an identification of an authentication key, data length, a list of receiving ECUs 108, and a classification of the receiving ECUs 108 and/or the transmitting ECUs 108 as common across types of the vehicles 110 or specific to a type of the vehicles 110.

The attributes include a classification of the message pattern 101 as an authenticated message pattern 101a or as an unauthenticated message pattern 101b. If a message pattern 101 is authenticated, then messages sent according to the message pattern 101 include some security feature to ensure that the messages have not been modified or spoofed in transit from the transmitting ECU 108 to the receiving ECU 108, e.g., a message authentication code 122 and/or a freshness value 124. If a message pattern 101 is unauthenticated, then messages sent according to the message pattern 101 lack such a security feature.

Authenticated message patterns 101a can include a freshness value 124. The freshness value 124 can be periodically refreshed with authenticated messages to the ECUs 108, or the freshness value 124 can incorporate a timestamp. The freshness value 124 in a message can be used by the receiving ECU 108 to determine that the message was sent recently, as opposed to a replay attack. In a replay attack, a message containing a security feature is saved and reused later by a third party so that the security feature grants access. The freshness value 124 can prevent a replay attack because the freshness value 124 in the saved message is out of date and thus not accepted by the receiving ECU 108.

Authenticated message patterns 101a can include a message authentication code 122. A message authentication code 122 is a piece of information included in a message to ensure that the transmitting ECU 108 and the receiving ECU 108 both have the same authentication key. The transmitting ECU 108 generates the message authentication code 122 by performing an operation on some portion of the message, e.g., the data content 120, and the receiving ECU 108 performs an operation on the message authentication code 122 to reproduce the authentication key and verify that the reproduced authentication key matches the authentication key stored on the receiving ECU 108.

The attributes can include an identification of an authentication key. The ECUs 108 can store multiple authentication keys for use with messages following different message patterns. The value for the identification of the authentication key can be a string uniquely specifying one of the authentication keys. The transmitting ECU 108 can generate the message authentication code 122 using an authentication key specified by the value of the identification of the authentication key of the message pattern 101 for that message. The receiving ECU 108 can use the value of the identification of the authentication key to select the operation for reproducing the authentication key from the message and to select the stored authentication key against which to the compare the reproduced authentication key.

The attributes can include a data length. The value of the data length can specify a length of the data content 120 of a message and correspondingly a value taken by the data length code 118 of the message, or the value of the data length can indicate that the length of the data content 120 and the value of the data length code 118 are variable for that message pattern 101. For example, the data length can be a constant value for a particular message pattern 101, rather than messages according to that message pattern 101 having varying data lengths.

The attributes can include the receiving ECUs 108 for the message pattern 101, i.e., the ECUs that will use at least one of the data types of the message pattern 101. The value for the receiving ECUs can be a list of identifiers and/or network addresses of the receiving ECUs 108. The receiving ECUs 108 for a particular message pattern 101 have that message pattern 101 installed to check against received messages. Messages sent according to a message pattern 101 can include the network addresses for the receiving ECUs 108 listed for that message pattern 101.

The attributes can include a classification of the receiving ECUs 108 and/or the transmitting ECUs 108 as common across types of the vehicles 110 or specific to a type of the vehicles 110. Different types, e.g., models, of the vehicles 110 can include some ECUs 108 in common and some ECUs 108 specific to the type.

Figure 3:
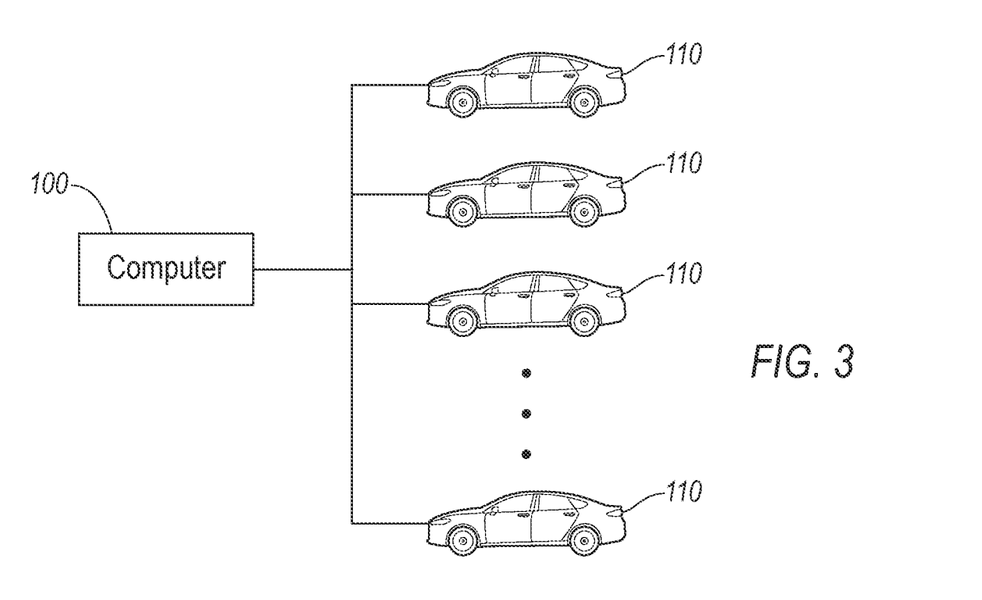
FIG. 3 is a block diagram of an example computer in communication with a plurality of the vehicles.

With reference to FIG. 3, the computer 100 is a microprocessor-based computing device, e.g., a generic computing device including a processor and a memory. The memory of the computer 100 can include media for storing instructions executable by the processor as well as for electronically storing data and/or databases. The computer 100 can be multiple computers coupled together.

The computer 100 can be programmed to transmit a set of message patterns 101 to a plurality of the vehicles 110, specifically to the ECUs 108 of the vehicles 110, in order to install the new set of the message patterns 101 on the ECUs 108. The message patterns 101 can be updated from a previous set of message patterns 101. The new set of message patterns 101 can replace the previous set of message patterns 101 on the vehicles 110, or the new set of message patterns can be the original message patterns 101 installed on the vehicles 110. Once installed on one of the vehicles 110, the new set of message patterns 101 can be used by the ECUs 108 to communicate as described above.

A set of message patterns 101 may include inconsistencies, e.g., introduced when updating the message patterns 101 from the previous set of message patterns 101. Inconsistencies can cause messages not to match the expected message patterns 101 of the receiving ECUs 108, meaning that the receiving ECUs 108 may reject the messages. The description below provides ways to remove inconsistencies from the set of message patterns 101 before installation, thereby ensuring robust operation of the ECUs 108 on board the vehicle 110.

The computer 100 can be programmed to assess a format of the message patterns 101 in a set of message patterns 101. A message pattern 101 is invalid if the message pattern 101 does not follow a set of rules for the message patterns 101 or if the message pattern 101 contradicts another message pattern 101 in the set, and valid otherwise. For example, a message pattern 101 can be invalid if the message pattern 101 is lacking a field such as data length code 118, the message pattern 101 specifies the same ECU 108 as both transmitting and receiving the message pattern 101, the message pattern 101 does not include any receiving ECUs 108, multiple message patterns 101 apply to the same data type, etc. The computer 100 can be programmed to receive a list of the ECUs 108 on board the vehicle 110 and to assess the format of the message patterns 101 based on the list of the ECUs 108. For example, a message pattern 101 can be invalid if one of the receiving ECUs 108 is not on the list of ECUs 108. The computer 100 can be programmed to, in response to at least one of the message patterns 101 having an invalid format, output a list of the message patterns 101 having an invalid format.

Returning to FIG. 2, the computer 100 can be programmed to generate the authentication statuses of the message patterns 101. The message patterns 101 can be unauthenticated message patterns 101b before the computer 100 generates the authentication statuses; e.g., the computer 100 can change all the message patterns 101 to unauthenticated message patterns 101a and remove the authentication-related attributes such as freshness values 124 and message authentication code 122. Alternatively, the message patterns 101 can be a mix of authenticated message patterns 101a and unauthenticated message patterns 101b when the computer 100 generates the authentication statuses. The computer 100 can receive a list of the ECUs 108 that support authentication. The computer 100 can generate the authentication status of each message pattern 101 based on whether all the transmitting ECUs 108 for that message pattern 101 support authentication, whether the subnetworks of the CAN bus 114 over which the message pattern 101 will travel support secure transmission of authenticated messages, whether the receiving ECUs 108 for the message pattern 101 classify any of the data types of the message pattern 108 as requiring authentication, etc. For example, the computer 100 can set the authentication status to authenticated for the message patterns 101 that have transmitting ECUs 108 that support authentication, that travel over subnetworks of the CAN bus 114 that support authenticated messages, and that include at least one data type requiring authentication, and the computer 100 can set the authentication status to unauthenticated otherwise.

The computer 100 can be programmed to generate attributes and/or values for the attributes for the authenticated message patterns 101a based on the authentication status as authenticated. For example, the computer 100 can apply the freshness value 124 and the message authentication code 122 to the authenticated message pattern 101a. For another example, the computer 100 can set the data length to a constant value for the data length code 118, e.g., 16 bits. The constant value for the data length code 118, i.e., the constant length of the data content 120, can aid with decoding an authenticated message by the receiving ECU 108 using the message authentication code 122. For another example, the computer 100 can set the message identification 116 so that the message identification 116 is unique and so that the message identification 116 indicates that the message is an authenticated message, thereby permitting the receiving ECU 108 to properly parse the message using the appropriate message pattern 101. Additionally, if the computer 100 received a mix of authenticated message patterns 101a and unauthenticated message patterns 101b before generating the authentication statuses, the computer 100 can remove the freshness value 124 and the message authentication code 122 from unauthenticated message patterns 101b that were authenticated message patterns 101a before generating the authentication statuses.

Figure 4:
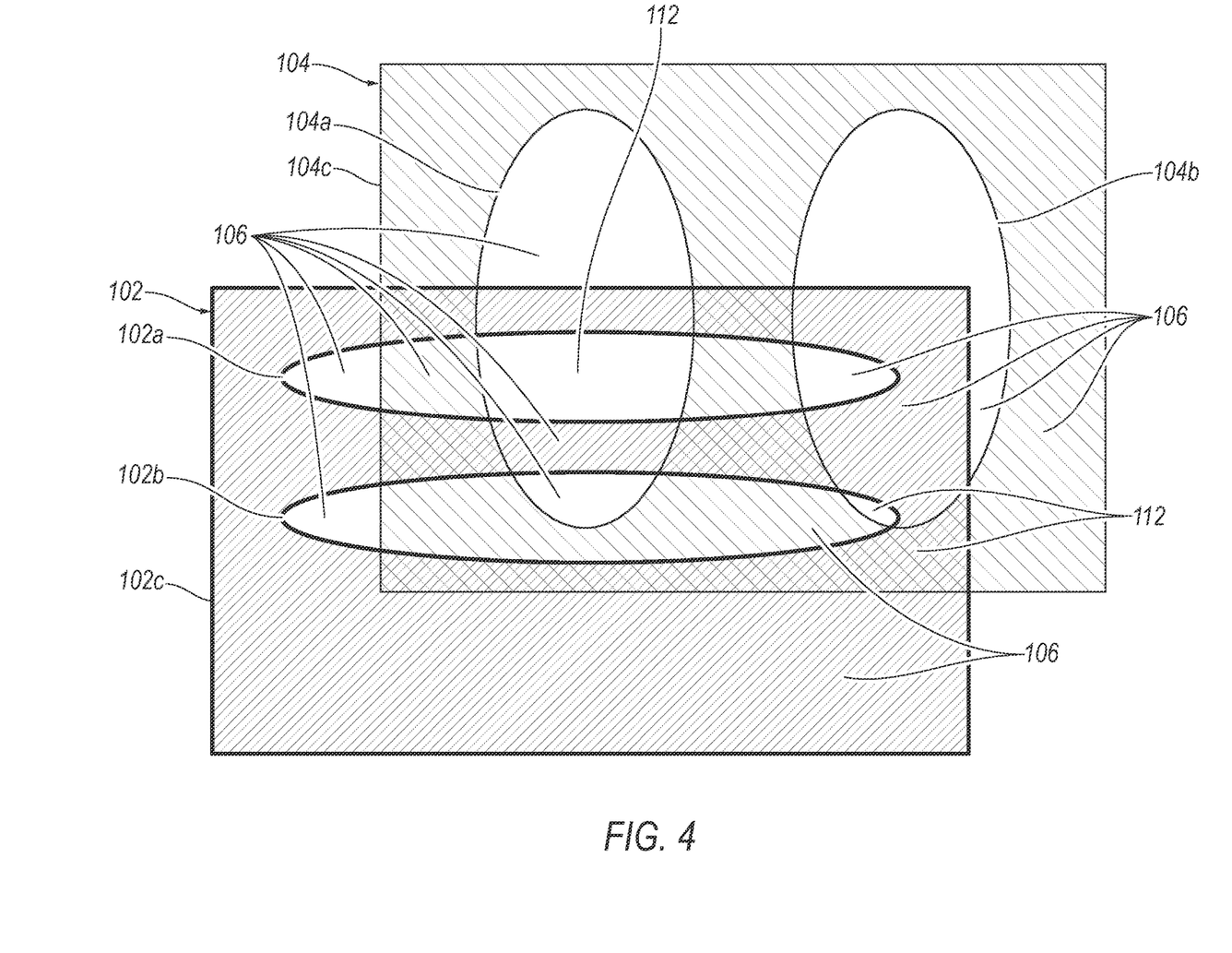
FIG. 4 is a Venn diagram of example classifications of first and second message patterns.

With reference to FIG. 4, the computer 100 can be programmed to compare two sets of message patterns 101, as will be described. The sets will be referred to as the first message patterns 102 and the second message patterns 104. For example, the first message patterns 102 can be a previous set of message patterns 101, and the second message patterns 104 can be an updated set of message patterns 101. The computer 100 can be programmed to generate a new set of message patterns 101 potentially different from both the first message patterns 102 and the second message patterns 104, as will be described. The new set of message patterns will be referred to as third message patterns 101.

The computer 100 can be programmed to determine a plurality of commonalities 112 present in the first message patterns 102 and present in the second message patterns 104. For the purposes of this disclosure, a "commonality" is defined as an identical trait for the same message pattern 101 in the first message patterns 102 and in the second message patterns 104. The commonalities 112 can include common message patterns 101 that are present in both the first message patterns 102 and the second message patterns 104. The commonalities 112 can include, for the common message patterns 101, the values for the attributes that are the same in both the first message patterns 102 and the second message patterns 104. For example, if both the first message patterns 102 and the second message patterns 104 include one message pattern 101 for the same set of data types, then the message pattern 101 is a common message pattern 101 that qualifies as a commonality 112. Continuing the example, if the common message pattern 101 has the same values for the attributes in the first message patterns 102 and second message patterns 104, then the attributes of the common message pattern 101 qualify as commonalities 112. On the other hand, if the value of an attribute has changed, e.g., a different list of receiving ECUs 108, then the changed attribute is not a commonality 112 but the remaining attributes are commonalities 112. The computer 100 can determine the commonalities 112, e.g., by comparing the data types for the respective first message patterns 102 with the data types for the respective second message patterns 104 to find message patterns 101 with matching data types, which are common message patterns 101, and then comparing the values for the attributes from the first message patterns 102 and the second message patterns 104 for the common message patterns 101 to find matching values.

The computer 100 can be programmed to determine a set of differences 106 between the first message patterns 102 and the second message patterns 104. Each difference 106 pertains to one message pattern 101, which may be in the first message patterns 102 only, in the second message patterns 104 only, or be a common message pattern 101. The differences 106 can include an absence of a message pattern 101 from the first message patterns 102 along with presence of the message pattern 101 in the second message patterns 104, an absence of a message pattern 101 from the second message patterns 104 along with presence of the message pattern 101 in the first message patterns 102, and a different value of an attribute for a common message pattern 101. The computer 100 can determine the differences 106, e.g., by listing the message patterns 101 from the first message patterns 102 and second message patterns 104 that are not common message patterns 101, and by comparing the values of the attributes from the first message patterns 102 and the second message patterns 104 for the common message patterns 101 to find nonmatching values.

The computer 100 can be programmed to determine a resolution for each of the differences 106, e.g., in a manner described below. For the purposes of this disclosure, a "resolution" is defined as a manner of eliminating a difference 106. The resolution is in favor of either the first message patterns 102 or the second message patterns 104; i.e., the difference 106 is resolved to match either the first message patterns 102 or the second message patterns 104. For example, if the difference 106 is that a message pattern 101 is absent from the first message patterns 102 and present in the second message patterns 104, then the resolution can be in favor of the first message patterns 102, i.e., absence of the message pattern 101, or the resolution can be in favor of the second message patterns 104, i.e., presence of the message pattern 101. For another example, if the difference 106 is a nonmatching value of an attribute for a common message pattern 101, e.g., the common message pattern 101 is unauthenticated in the first message patterns 102 and authenticated in the second message patterns 104, then the resolution can be in favor of the first message patterns 102, i.e., the common message pattern 101 is unauthenticated, or the resolution can be in favor of the second message patterns 104, i.e., the common message pattern 101 is authenticated.

Determining the resolution can include selecting either the first message patterns 102 or the second message patterns 104 according to a set of rules. For a given difference 106 involving a message pattern 101, the set of rules can define the resolution based on whether the message pattern 101 is a common message pattern 101, absent from the first message patterns 102, or absent from the second message patterns 104; the values of the attributes of the message pattern 101 in the first message patterns 102; and/or the values of the attributes of the message pattern 101 in the second message patterns 104. The set of rules can be deterministic, i.e., providing the same resolution when given the same inputs. The resolution according to the set of rules can be an automatic resolution in favor of the first message patterns 102, an automatic resolution in favor of the second message patterns 104, or prompting a user for a manual resolution in favor of either the first message patterns 102 or the second message patterns 104, as will be described below.

The set of rules can define the resolution for a given difference 106 based on the presence or absence of the message pattern 101 from the first message patterns 102 and the second message patterns 104 and based on the values of the attributes of the message pattern 101 in the first message patterns 102 and/or the second message patterns 104. For example, the set of rules can depend on absence of one of the second message patterns 104 from the first message patterns 102, absence of one of the first message patterns 102 from the second message patterns 104, classification of a common message pattern 101 as authenticated in the first message patterns 102 and as unauthenticated in the second message patterns 104, classification of a common message pattern 101 as unauthenticated in the first message patterns 102 and as authenticated in the second message patterns 104, etc. For example, FIG. 4 shows a Venn diagram in which the different regions defined by the overlapping shapes represent combinations of a status in the first message patterns 102, e.g., authenticated first message patterns 102a, invalid first message patterns 102b, valid and unauthenticated first message patterns 102c, or absent from the first message patterns 102, and a corresponding status in the second message patterns 104, e.g., authenticated second message patterns 104a, invalid second message patterns 104b, valid and unauthenticated second message patterns 104c, or absent from the second message patterns 104.

The set of rules can be chosen based on sources of differences 106 for absences and differing attributes. For example, if the first message patterns 102 are a previous set of message patterns 101 and the second message patterns 104 are an updated set of message patterns 101, then the resolution for an absence of one of the second message patterns 104 from the first message patterns 102 can be in favor of the second message patterns 104, i.e., including the message pattern 101, because the source of the difference 106 is that an update added a new message pattern 101. Continuing the example, the resolution for an absence of one of the first message patterns 102 from the second message patterns 104 can be prompting the user for a manual resolution to ensure that the message pattern 101 was not deleted in error. The resolution can thus be different for the absence of one of the second message patterns 104 from the first message patterns 102 than for the absence of one of the first message patterns 102 from the second message patterns 104. Likewise, the resolution can be different for the classification of a common message pattern 101 as unauthenticated in the first message patterns 102 and as authenticated in the second message patterns 104 than for the classification of the common message pattern 101 as authenticated in the first message patterns 102 and as unauthenticated in the second message patterns 104.

The set of rules can include at least one lookup table, e.g., can be instantiated as at least one lookup table. For example, the lookup table(s) can include columns for the inputs described above, e.g., presence or absence of the message pattern 101 from the first message patterns 102, presence or absence of the message pattern 101 from the second message patterns 104, valid or invalid format of the message pattern 101 in the first message patterns 102, valid or invalid format of the message pattern 101 in the second message patterns 104, authentication status in the first message patterns 102, authentication status in the second message patterns 104, and values of the other attributes in the first message patterns 102 and in the second message patterns 104. For example, the lookup table(s) can be split into multiple lookup tables applying to different combinations of inputs, e.g., one lookup table for differences 106 in values for attributes of common message patterns 101, and another lookup table for absences of message patterns 101 or absences of attributes of common message patterns 101 from one of the first message patterns 102 or second message patterns 104.

The lookup table(s) can include rows for each possible combination of values for the columns, and each row can include a resolution for that combination of values for the columns. (Rows and columns can be swapped without changing functionality.) The output of the lookup table is the resolution from the applicable row, e.g., one of an automatic resolution in favor of the first message patterns 102, an automatic resolution in favor of the second message patterns 104, or prompting a user for a manual resolution in favor of either the first message patterns 102 or the second message patterns 104, i.e., one of selecting the first message patterns 102, selecting the second message patterns 104, and receiving the input indicating the selection.

An automatic resolution means to select the first message patterns 102 or the second message patterns 104 without receiving the input. Selecting the first message patterns 102 or the second message patterns 104 without receiving the input can be performed according to the set of the rules, e.g., according to the output of the lookup table, as described above.

A manual resolution means to output to the operator a prompt to select the first message patterns 102 or the second message patterns 104 for the resolution. For example, the prompt can be included in a list of prompts for all the differences 106 for which manual resolutions are requested. The computer 100 can be programmed to output the prompt to select the first message patterns 102 or the second message patterns 104, receive an input from the operator indicating the selection of the first message patterns 102 or the second message patterns 104, and determine the resolution in favor of the selected one of the first message patterns 102 and the second message patterns 104.

The computer 100 can be programmed to, upon determining the automatic resolutions, output one or more lists based on the set of differences 106. For example, the computer 100 can output a list of the first message patterns 102 with accompanying differences 106 and commonalities 112 indicated, a list of the second message patterns 104 with accompanying differences 106 and commonalities 112 indicated, and/or a list of the differences 106 with the automatic resolutions and/or the prompts to select the manual resolutions. The lists can therefore include any of the first message patterns 102 or second message patterns 104 not included in the third message patterns 101. The computer 100 can also output one or more of the same lists restricted to authenticated message patterns 101a. The computer 100 can also output a list of data types of the first message patterns 102 with accompanying differences 106 and commonalities 112, a list of data types of the second message patterns 104 with accompanying differences 106 and commonalities 112, and/or a list of the data types of the differences 106.

The computer 100 can be programmed to, upon receiving the manual resolutions, generate the third message patterns 101. The third message patterns 101 include the resolutions and the commonalities 112 between the first message patterns 102 and the second message patterns 104. For example, if the first message patterns 102 are a previous set of message patterns 101 and the second message patterns 104 are updated message patterns 101, then the third message patterns 101 are updated message patterns 101 for which all the changes have been checked for errors and inconsistencies. The automatic resolutions permit checking for errors and inconsistencies to be performed in a reliable manner and in a reasonable timeframe. The large number of message patterns 101 on a vehicle 110—typically thousands—means that manual resolution for all differences 106 may be infeasible. The computer 100 can be programmed to output a list including the third message patterns 101.

The computer 100 can be programmed to transmit the third message patterns 101 to the ECUs 108, e.g., through a wired or wireless connection. For example, the third message patterns 101 can be transmitted to the ECUs 108 on new vehicles 110 shortly after the vehicles 110 are assembled. For another example, the third message patterns 101 can be transmitted to the ECUs 108 before the ECUs 108 are installed on the vehicles 110. For another example, the third message patterns 101 can be transmitted wirelessly as an over-the-air update to the ECUs 108 on vehicles 110 in use. The third message patterns 101 can be installed on the ECUs 108, and the ECUs 108 can use the third message patterns 101 when transmitting messages to each other, as described above.

Figure 5:
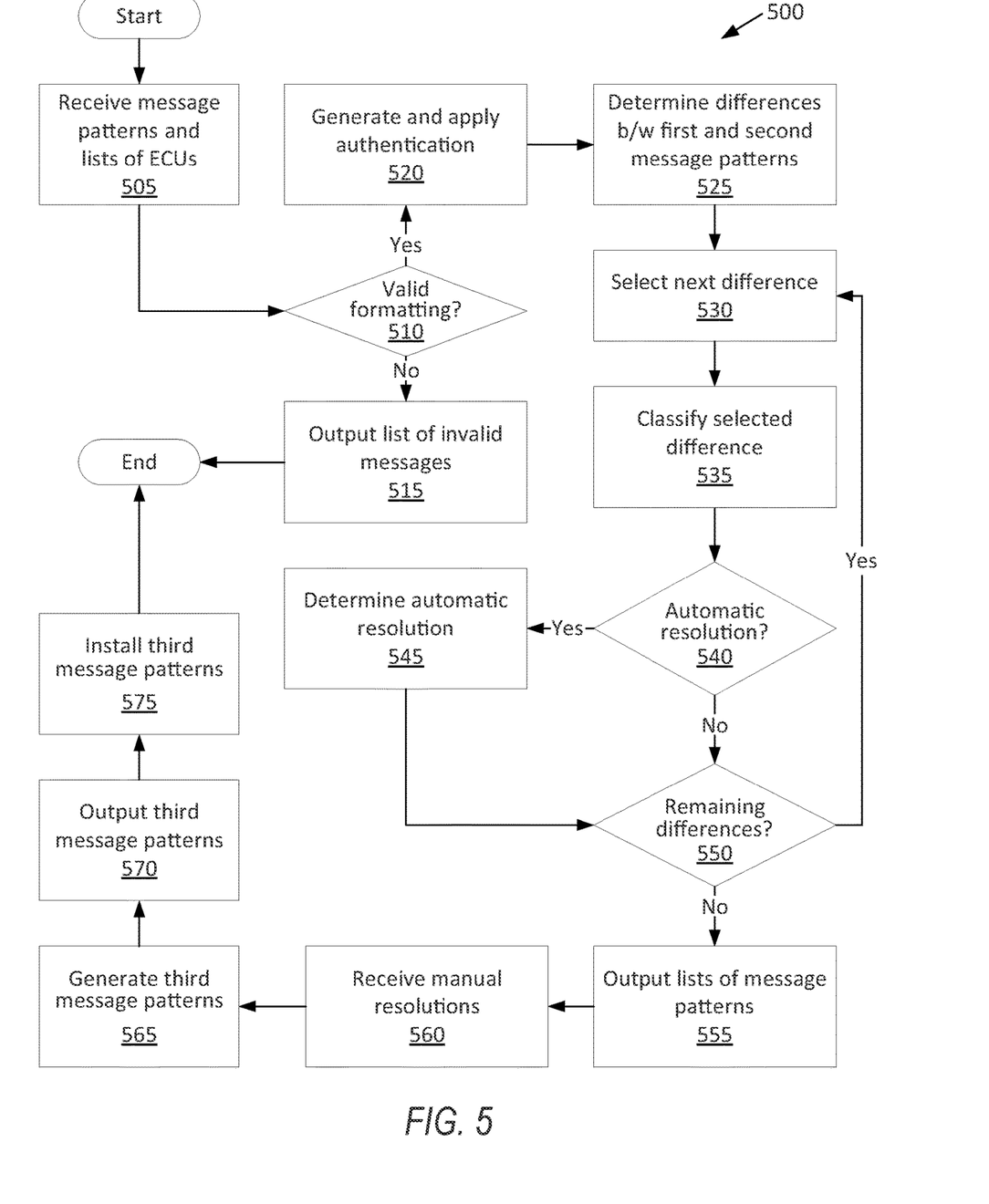
FIG. 5 is a process flow diagram of an example process for resolving differences between the first and second message patterns.

FIG. 5 is a process flow diagram illustrating an exemplary process 500 for resolving the differences 106 between the first message patterns 102 and the second message patterns 104. The memory of the computer 100 stores executable instructions for performing the steps of the process 500. As a general overview of the process 500, the computer 100 receives the first message patterns 102 and the second message patterns 104, determines whether the first message patterns 102 and second message patterns 104 have valid formats, and outputs a list of invalid message patterns 101 if not. The computer 100 generates the authentication statuses for the first message patterns 102 and second message patterns 104, generates attributes of the authenticated first message patterns 102 and authenticated second message patterns 104, and determines the differences 106 between the first message patterns 102 and the second message patterns 104. For each difference 106, the computer 100 classifies the difference 106 and determines either an automatic resolution or that a manual resolution will be requested. The computer 100 outputs the lists of message patterns 101, including the prompts for manual resolutions; receives the manual resolutions; generates the third message patterns 101; outputs the third message patterns 101; and transmits the third message patterns 101 to the ECUs 108 for installation.

The process 500 begins in a block 505 in which the computer 100 receives the first message patterns 102 and the second message patterns 104, as described above, along with lists of the ECUs 108 on board the vehicle 110.

Next, in a decision block 510, the computer 100 assesses the format of the first message patterns 102 and the second message patterns 104, as described above. In response to at least one of the first message patterns 102 or second message patterns 104 having an invalid format, the process 500 proceeds to a block 515. In response to none of the first message patterns 102 and second message patterns 104 having an invalid format, the process 500 proceeds to a block 520.

In the block 515, the computer 100 outputs a list of the first message patterns 102 and/or second message patterns 104 having an invalid format, as described above. After the block 515, the process 500 ends.

In the block 520, the computer 100 generates the authentication statuses for the first message patterns 102 and for the second message patterns 104, and the computer generates the attributes for the authenticated first message patterns 102 and authenticated second message patterns 104, as described above.

Next, in a block 525, the computer 100 determines the set of the differences 106 between the first message patterns 102 and the second message patterns 104, as described above.

Next, in a block 350, the computer 100 selects a next difference 106 from the set of the differences 106, e.g., in ascending order of the message identification 116.

Next, in a block 353, the computer 100 classifies the selected difference 106, e.g., according to presence or absence of the message pattern 101 in the first message patterns 102 and second message patterns 104 and the values of the attributes of the message pattern 101 in the first message patterns 102 and second message patterns 104, as described above.

Next, in a decision block 540, the computer 100 determines whether the selected difference 106 has an automatic resolution, e.g., according to the set of rules, e.g., an output of the lookup table in favor of the first message patterns 102 or the second message patterns 104, or an output of the lookup table of manual resolution, as described above. In response to the selected difference 106 having an automatic resolution, the process 500 proceeds to a block 545. In response to the selected difference 106 needing a manual resolution, the process 500 proceeds to a decision block 550.

In the block 545, the computer 100 determines the automatic resolution in favor of either the first message patterns 102 or the second message patterns 104, as described above. After the block 545, the process 500 proceeds to the decision block 550.

In the decision block 550, the computer 100 determines whether the selected difference 106 is the last difference 106 in the set of the differences 106 or whether the set includes remaining differences 106. If there are remaining differences 106, the process 500 returns to the block 530 to continue to the next difference 106. If the selected difference 106 is the last difference 106, the process 500 proceeds to a block 555.

In the block 555, the computer 100 outputs the lists of the message patterns 101 and the prompts for the manual resolutions, as described above.

Next, in a block 560, the computer 100 receives the inputs indicating the selection of the first message patterns 102 or the second message patterns 104 for the manual resolutions, as described above.

Next, in a block 565, the computer 100 generates the third message patterns 101, as described above.

Next, in a block 570, the computer 100 outputs a list including the third message patterns 101, as described above.

Next, in a block 575, the computer 100 transmits the third message patterns 101 to the ECUs 108 on board the vehicles 110, as described above. After the block 575, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first," "second," and "third" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
    receive a plurality of first message patterns, the first message patterns defining messaging between electronic control units on board a vehicle, the first message patterns including first values for attributes assigned to the respective first message patterns;
    receive a plurality of second message patterns, the second message patterns defining messaging between the electronic control units on board the vehicle, the second message patterns including second values for the attributes assigned to the respective second message patterns;
    determine a set of differences between the first message patterns and the second message patterns;
    for at least one of the differences, determine a respective resolution in favor of either the first message patterns or the second message patterns; and
    generate a plurality of third message patterns, the third message patterns including the at least one resolution and commonalities between the first message patterns and the second message patterns.

2. The computer of claim 1, wherein the instructions further include instructions to generate authentication statuses of the first message patterns and of the second message patterns, each authentication status is a classification of the respective message pattern as authenticated or unauthenticated, and the attributes include the authentication status.

3. The computer of claim 2, wherein generating the authentication statuses is based on whether the ECUs designated to transmit the respective message patterns support authentication.

4. The computer of claim 2, wherein the instructions further include instructions to generate at least one of the first values and at least one of the second values based on the authentication statuses.

5. The computer of claim 1, wherein the set of differences includes absence of one of the first message patterns from the second message patterns.

6. The computer of claim 1, wherein the commonalities include a common message pattern present in the first message patterns and present in the second message patterns, and the set of differences includes classification of the common message pattern as authenticated in the first values of the attributes and as unauthenticated in the second values of the attributes.

7. The computer of claim 1, wherein determining the at least one resolution includes selecting either the first message patterns or the second message patterns according to a set of rules.

8. The computer of claim 7, wherein the set of the rules depends on absence of one of the first message patterns from the second message patterns.

9. The computer of claim 7, wherein the commonalities include a common message pattern present in the first message patterns and present in the second message patterns, and the set of the rules depends on classification of the common message pattern as authenticated in the first values of the attributes and as unauthenticated in the second values of the attributes.

10. The computer of claim 7, wherein the set of the rules includes at least one lookup table, and an output of the at least one lookup table includes the selection of the first message patterns or the second message patterns.

11. The computer of claim 10, wherein inputs of the at least one lookup table include presence or absence of the respective first message patterns, presence or absence of the respective second message patterns, authentication or unauthentication of the respective first message patterns, and authentication or unauthentication of the respective second message patterns.

12. The computer of claim 1, wherein the at least one resolution is at least one automatic resolution, and the instructions further include instructions to, for at least one of the differences, receive a respective input from an operator indicating a selection of the first message patterns or the second message patterns for a respective manual resolution.

13. The computer of claim 12, wherein the instructions further include instructions to output to the operator a prompt to select the first message patterns or the second message patterns for the at least one manual resolution.

14. The computer of claim 1, wherein the instructions further include instructions to, according to a set of rules, for at least one of the differences, determine whether (a) to receive an input from an operator indicating the selection of the first message patterns or the second message patterns for a respective resolution or (b) to select the first message patterns or the second message patterns without receiving the input for the respective resolution.

15. The computer of claim 14, wherein selecting the first message patterns or the second message patterns without receiving the input is performed according to the set of the rules.

16. The computer of claim 14, wherein the set of the rules includes a lookup table, and an output of the lookup table includes the determination to receive the input indicating the selection or to select without receiving the input, based on the set of the differences.

17. The computer of claim 1, wherein the instructions further include instructions to assess a format of the first message patterns, and in response to at least one of the first message patterns having an invalid format, output a list of the at least one of the first message patterns having an invalid format.

18. The computer of claim 1, wherein the instructions further include instructions to output a first list including the third message patterns, and output a second list including any of the first message patterns or second message patterns not included in the third message patterns.

19. The computer of claim 1, wherein the instructions further include instructions to transmit the third message patterns to the electronic control units on board the vehicle.

20. A method comprising:

receiving a plurality of first message patterns, the first message patterns defining messaging between electronic control units on board a vehicle, the first message patterns including first values for attributes assigned to the respective first message patterns, the first values including a classification of the respective first message pattern as authenticated or unauthenticated;

receiving a plurality of second message patterns, the second message patterns defining messaging between the electronic control units on board the vehicle, the second message patterns including second values for the attributes assigned to the respective second message patterns, the second values including a classification of the respective second message pattern as authenticated or unauthenticated;

determining a set of differences between the first message patterns and the second message patterns;

for at least one of the differences, determining a respective resolution in favor of either the first message patterns or the second message patterns; and generating a plurality of third message patterns, the third message patterns including the at least one resolution and commonalities between the first message patterns and the second message patterns.

* * * * *